(12) United States Patent
Marejka et al.

(10) Patent No.: US 7,080,093 B2
(45) Date of Patent: Jul. 18, 2006

(54) SYSTEM AND METHOD FOR DATABASE DESIGN

(75) Inventors: Richard Marejka, Nobleton (CA); Guy Birkbeck, Scarborough (CA); Louis Ferrante, Nobleton (CA); Dariusz Dabrowski, Toronto (CA)

(73) Assignee: Sun Microsystems, Inc., Santa Clara, CA (US)

( * ) Notice: Subject to any disclaimer, the term of this patent is extended or adjusted under 35 U.S.C. 154(b) by 458 days.

(21) Appl. No.: 10/307,866

(22) Filed: Dec. 2, 2002

(65) Prior Publication Data

US 2003/0144987 A1 Jul. 31, 2003

Related U.S. Application Data

(60) Provisional application No. 60/377,125, filed on Apr. 30, 2002, provisional application No. 60/348,328, filed on Jan. 14, 2002, provisional application No. 60/348,631, filed on Jan. 14, 2002.

(51) Int. Cl.
*G06F 17/30* (2006.01)

(52) U.S. Cl. ............... 707/102; 717/106; 717/109; 717/114; 717/115

(58) Field of Classification Search ........ 707/100–102; 717/106, 109, 114–115
See application file for complete search history.

(56) References Cited

U.S. PATENT DOCUMENTS

| | | | |
|---|---|---|---|
| 5,732,262 A * | 3/1998 | Gillespie et al. ............ 707/102 |
| 5,809,296 A | 9/1998 | Yong et al. | |
| 5,933,831 A | 8/1999 | Jorgensen | |
| 5,949,976 A | 9/1999 | Chappelle | |
| 5,980,078 A * | 11/1999 | Krivoshein et al. ............ 700/1 |
| 5,999,730 A * | 12/1999 | Lewis ....................... 717/109 |
| 6,014,669 A | 1/2000 | Slaughter et al. | |
| 6,205,447 B1 | 3/2001 | Malloy | |
| 6,212,530 B1 | 4/2001 | Kadlec | |
| 6,289,334 B1 | 9/2001 | Reiner et al. | |
| 6,298,349 B1 | 10/2001 | Toyoshima et al. | |
| 6,342,907 B1 * | 1/2002 | Petty et al. ................. 715/762 |
| 6,366,898 B1 | 4/2002 | Taivalsaari et al. | |
| 6,374,256 B1 | 4/2002 | Ng et al. | |
| 6,385,618 B1 | 5/2002 | Ng et al. | |
| 6,405,189 B1 | 6/2002 | Gillis | |
| 2002/0016954 A1 * | 2/2002 | Charisius et al. ............. 717/2 |
| 2005/0229154 A1 * | 10/2005 | Hiew et al. ................. 717/110 |

OTHER PUBLICATIONS

Owen, Cathy, Data Modeling & Relational Database Design, Solutions Journal, The IDUG Solutions Journal, Mar. 1998, vol. 5, No. 1, http://www.Idug.org/member/journal/mar98/dmodeldb.html, pp. 1-4.

* cited by examiner

*Primary Examiner*—Uyen Le
*Assistant Examiner*—Hanh Thai
(74) *Attorney, Agent, or Firm*—Michael C. Martensen; William J. Kubida; Hogan & Hartson LLP

(57) ABSTRACT

A system and method for database design is disclosed. DDL code, which may be generated by a suitable CASE tool, is bound to tags rather than to specific system parameters. The DDL code may be stored in a suitable data structure, such as a directory tree. A series of scripts are provided with the DDL code. The scripts may invoke an editor, such as the Unix stream editor, to bind the tagged DDL code to specific system parameters.

8 Claims, 4 Drawing Sheets

Patent

| patent_no: VARCHAR2(12) |
|---|
| Date_of_Patent: DATE<br>Patent_Description: VARCHAR2(2000)<br>Inventor: VARCHAR2(128)<br>Notice: VARCHAR2(2000)<br>Application_No: VARCHAR2(20)<br>Filed_dt: DATE |

FIG. 1

SYSTEM AND METHOD FOR DATABASE DESIGN

CROSS-REFERENCE TO RELATED APPLICATIONS

This application claims the benefit of U.S. Provisional Application No. 60/348,631, filed Jan. 14, 2002, the disclosure of which is herein specifically incorporated in its entirety by this reference.

This application claims the benefit of U.S. Provisional Application No. 60/348,328, filed Jan. 14, 2002, and U.S. Provisional Application No. 60/377,125, filed Apr. 30, 2002 the disclosures of which are herein specifically incorporated in their entirety by this reference.

BACKGROUND OF THE INVENTION

1. Field of the Invention

The present invention relates in general to database design and development, and more particularly to database design systems and methods that improve the adaptability and scalability of database designs.

2. Background

A relational database stores data in tables having rows (records) and columns (fields). The tables are usually interrelated, and thus, there is a logical structure imposed on the database. This logical structure is known in the art as a 'schema'. Each table may have a primary key, comprising one or more columns that uniquely identify a row. For example, in a table with rows of customers, a column storing each customer's social security number may be used as the primary key because it uniquely identifies each customer in the table. A table may also have one or more foreign keys, associating a row in one table to one or more rows in another table. For example, where one table contains customer information and another table contains order information for the customers, a foreign key may exist in the order table to relate one customer (or row) in the customer table with one or more orders (or rows) in the order table.

Database design has become a relatively automated process. Computer Aided Software Engineering (CASE) tools permit database designers to use graphics-based tools to depict the database schema the designer wishes to implement. CASE tools generate Data Definition Language (DDL) code that implements the schema depicted in the graphics. This code may then be used to implement the database in one or more locations.

By way of example, FIG. 1 is a graphical depiction of a database schema consisting of a single table for holding information about patents. A database designer may use a suitable CASE tool (e.g., Erwin, Designer 6.i, Rational Rose) to create a graphical depiction as illustrated in FIG. 1. One of the things the CASE tool would do is to generate DDL code from this graphical depiction. The DDL code may look as follows:

```
CREATE TABLE Patent (
    patent_no        VARCHAR2(12) NOT NULL,
    Date_of_Patent   DATE NULL,
    Patent_Description VARCHAR2(2000) NULL,
    Inventor         VARCHAR2(128) NULL,
    Notice           VARCHAR2(2000) NULL,
    Application_No   VARCHAR2(20) NULL,
    Filed_dt         DATE NULL
);
```

```
ALTER TABLE Patent
    ADD ( PRIMARY KEY (patent_no) );
```

This code may be referred to as the 'logical footprint' of the table. Applications that access this table expect it to have the attributes defined as above. However, one problem with this definition is that it is not complete from a physical perspective. That is, it does not include a reference to size or placement of the objects within the database. A more realistic definition would be as follows:

```
CREATE TABLE Patent (
    patent_no        VARCHAR2(12) NOT NULL,
    Date_of_Patent   DATE NULL,
    Patent_Description VARCHAR2(2000) NULL,
    Inventor         VARCHAR2(128) NULL,
    Notice           VARCHAR2(2000) NULL,
    Application_No   VARCHAR2(20) NULL,
    Filed_dt         DATE NULL
)
PCTFREE 10
PCTUSED 40
MAXTRANS UNLIMITED
TABLESPACE PATENT_DATA_TS
STORAGE (
    INITIAL 1M
    NEXT 1M
    PCTINCREASE 0
    FREELISTS 1
    FREELIST GROUPS 1
)
;
ALTER TABLE Patent
    ADD ( PRIMARY KEY (patent_no)
    USING INDEX
        PCTFREE 10
        TABLESPACE PATENT_INDX_TS
        STORAGE (
            INITIAL 128K
            NEXT 128K
            PCTINCREASE 0
            FREELISTS 1
            FREELIST GROUPS 1
        ) )
;
```

This DDL code provides a more complete description of the size and attributes of various fields in the database. This is sometimes referred to as 'binding' the DDL code to a specific configuration. However, without an understanding of the intent of the implementation (i.e., development, test, production, etc.) or the topography of the computer systems on which the database will be implemented, the designer is defining, at best, arbitrary dependencies and sizing for the fields. Typically, the implementer of the design is burdened with the task of editing the DDL code to meet their intent. This represents a significant burden on database implementers and a significant expense to employers.

This burden increases significantly as the scale of the system grows. The above example is a simple example of a single table and a single index. This problem also exists in creation of the database, the tablespaces which hold database objects and many other places in RDBMS implementation. A typical application implementation may include at least 50 tables, and it is not unusual to have 100–200 tables in an application. Large implementations can use several thousand tables.

In addition, during the development of any schema, it may be implemented in different physical environments and sizes. First, it may be implemented for application development purposes. Second, it may be re-implemented in a test-bed environment. Third, it may be re-deployed for stress/throughput testing, and finally implemented in one or more production environments. Each environment must maintain the 'logical footprint' defined in the DDL code, but physical sizing and placement, critical to the acquisition and maintenance of performance and manageability, differ with each implementation. By way of example, each operating environment may have a different number of drives that operate at different speeds. Binding DDL code to a slower drive would inhibit the performance of the database.

In sum, binding DDL code to a specific configuration presents advantages and disadvantages. Advantageously, it permits database designers to generate more realistic and complete DDL code. However, the party responsible for implementing the database may have to modify the parameters each time DDL code is installed on a computer system having a different topology.

Therefore, there is a need in the art for systems and methods that permit a designer to enrich and encapsulate physical attributes into DDL code, while also permitting the implementer of the design to choose sizing and placement to accommodate multiple and changing objectives.

SUMMARY OF THE INVENTION

The present invention addresses this problem by implementing software design techniques that permit the database code to bind to variables representative of physical parameters, rather than hard-coded physical parameters. In addition, this invention provides software for use, e.g., by a database administrator responsible for installing a database, that permits the database administrator to enter, at the time of installation, the physical parameters of the particular hardware platform onto which the database is being installed. The software may be implemented as a series of scripts that take information about the physical configuration provided, e.g., by a database administrator and consistently bind it to a copy of the source DDL.

Advantageously, this invention permits the database design code to be bound to the physical parameters entered by the database administrator at the time of installation. This enhances the adaptability of the database design code. For example, if there are changes in the physical configuration of a platform, then the database administrator no longer needs to scour the database design code for the particular parameters. In addition, this enhances the portability of the database code across different hardware platforms. For example, a database administrator responsible for installing a database on multiple platforms need only execute the script once for each platform.

In an exemplary embodiment, the invention provides a method of designing and implementing a database. The method comprises generating database design code, and binding the database design code to tags representative of physical parameters of a hardware platform.

In another embodiment, the invention provides a computer program product in a computer readable medium for designing and implementing a database. The computer program product comprises logic instructions, executable on a processor, for generating database design code, and logic instructions, executable on a processor, for binding the database design code to tags representative of physical parameters of a hardware platform.

BRIEF DESCRIPTION OF THE DRAWINGS

FIG. 1 is a graphical depiction of a database schema consisting of a single table for holding information about patents;

DETAILED DESCRIPTION OF THE PREFERRED EMBODIMENTS

Figure 2:
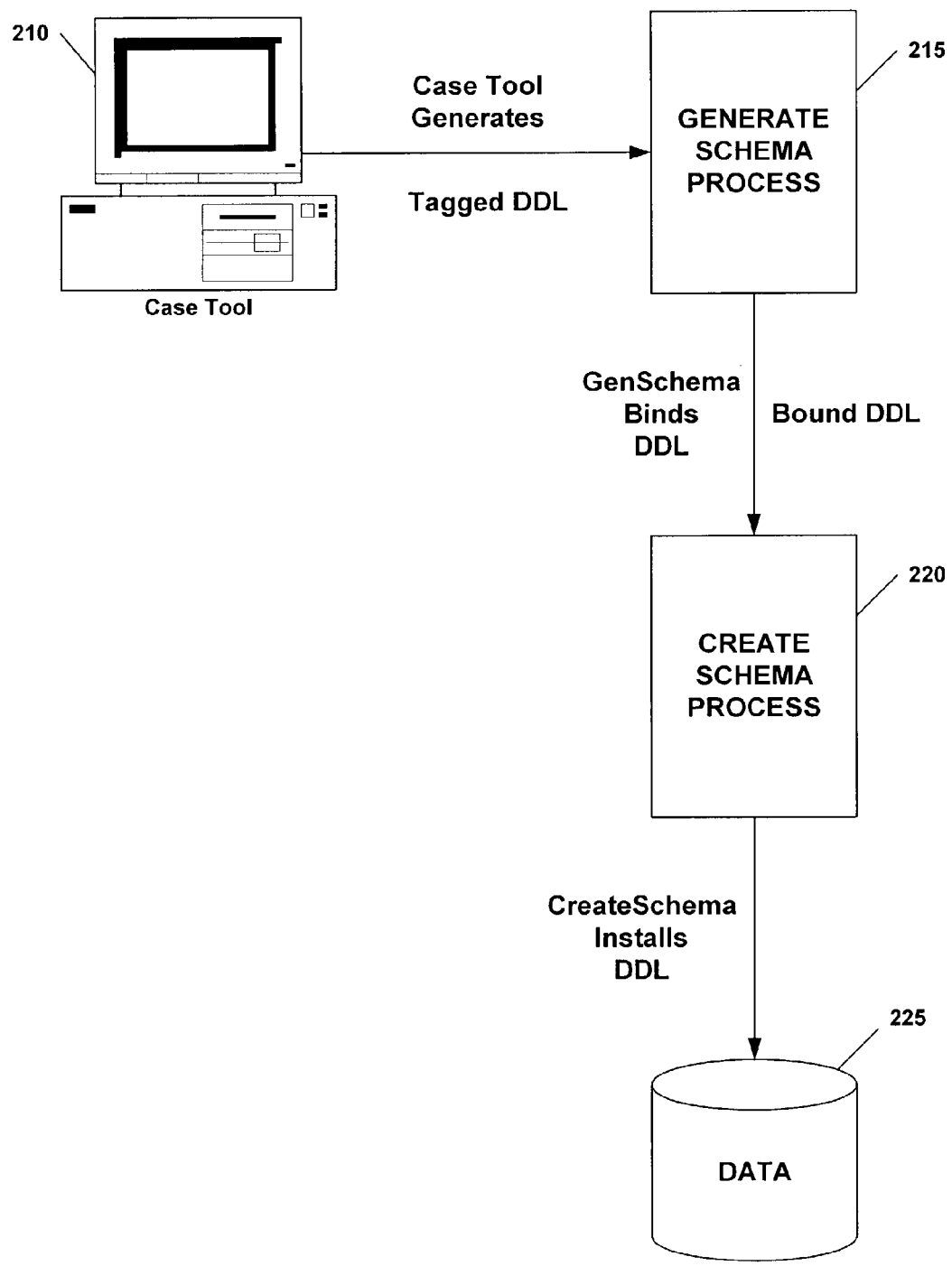
FIG. 2 is a process flow diagram that provides an illustrative overview of an exemplary database design and implementation method in accordance with the present invention.

The present invention addresses these and other problems by permitting database designers to bind DDL code to variables or "tags", rather than to specific values of physical attributes. FIG. 2 is a process flow diagram that provides an illustrative overview of an exemplary database design and implementation method in accordance with the present invention. Referring to FIG. 2, a suitable Computer Aided Software Engineering (CASE) tool 210 may be used to generate DDL code. A generate schema process 215 binds the tagged DDL code to parameters directly connected to the physical layout of a computer system, and a create schema process 220 installs the DDL code into a target database.

Figure 3:
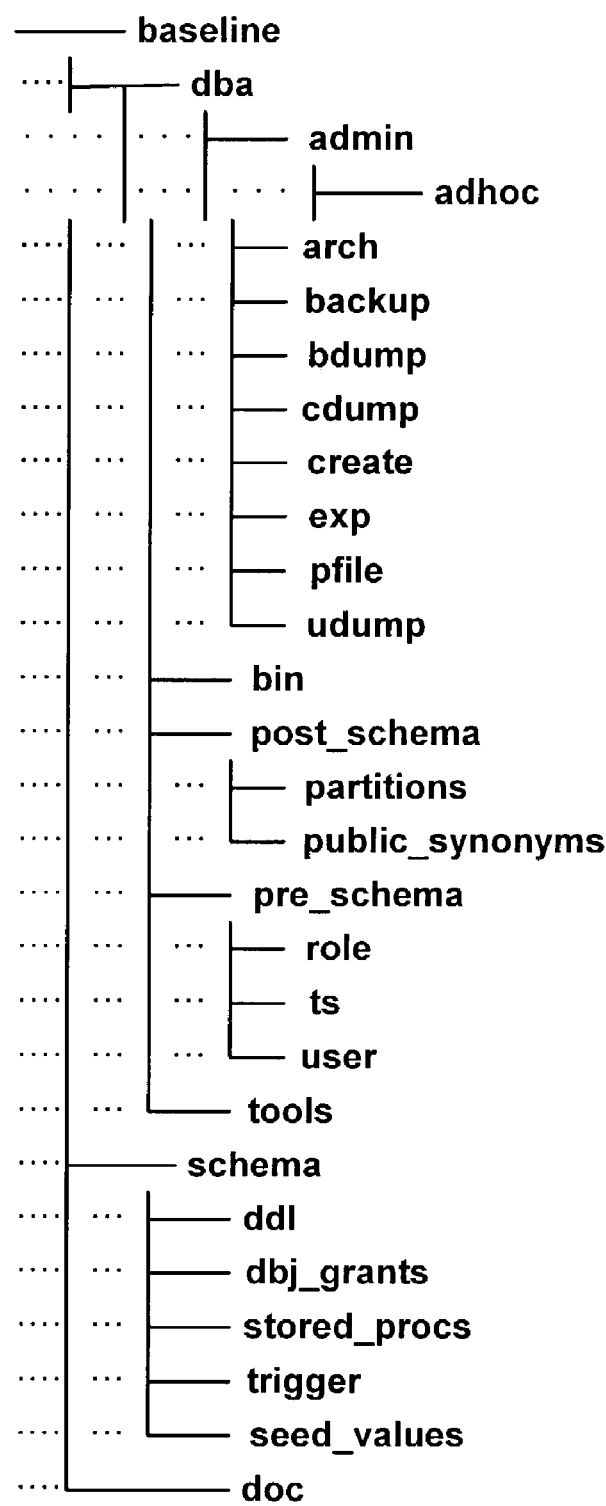
FIG. 3 is a schematic illustration of a tree structure in which the source DDL may be organized.

FIG. 3 is a schematic illustration of a tree structure in which the source DDL may be organized. The name of the root tree is 'baseline', and it includes a sub-tree 'dba', which itself includes further sub-trees. The sub-tree 'bin' includes all binary files for installation. The sub-tree 'post_schema' includes all post-install activities. The sub-tree 'partitions' includes all table partitions. The sub-tree 'public_synonyms' includes any public synonyms required for access. The 'pre-schema' sub-tree includes all pre-install activities that must be performed before installation. The 'role' sub-tree includes roles and permissions required for access. The 'ts' sub-tree includes information require for tablespace creation. The 'user' sub-tree includes users who own database objects, i.e., the database schema. A 'tools' sub-tree includes general database administrator tools. A 'schema' sub-tree includes install information. The 'ddl' sub-tree includes ddl code. The 'obj_grants' sub-tree includes security control information. The 'stored_procs' includes stored procedures for the database. The 'trigger' sub-tree includes stored triggers for the database. The 'seed_values' sub-tree includes initial values to be loaded in the database. The 'doc' sub-tree includes documentation.

All source information in the tree is provided in tagged format. By way of example, the DDL for a table generated in accordance with the present invention may look as follows:

```
CREATE TABLE Patent (
    patent_no          VARCHAR2(12) NOT NULL,
    Date_of_Patent     DATE NULL,
    Patent_Description VARCHAR2(2000) NULL,
    Inventor           VARCHAR2(128) NULL,
    Notice             VARCHAR2(2000) NULL,
    Application_No     VARCHAR2(20) NULL,
    Filed_dt           DATE NULL
)
PCTFREE #PCT_FREE#
PCTUSED #PCT_USED#
```

-continued

```
        MAXTRANS UNLIMITED
        TABLESPACE #DATA_TS_00#
        STORAGE (
            INITIAL #INITIAL#
            NEXT #INITIAL#
            PCTINCREASE #PCT_INCREASE#
            FREELISTS #FREE_LISTS#
            FREELIST GROUPS #FREE_LIST_GRPS#
        )
    ;
    ALTER TABLE Patent
        ADD ( PRIMARY KEY (patent_no)
        USING INDEX
            PCTFREE #PCT_FREE#
            TABLESPACE #INDX_TS_00#
            STORAGE (
                INITIAL #INITIAL#
                NEXT #INITIAL#
                PCTINCREASE #PCT_INCREASE#
                FREELISTS #FREE_LISTS#
                FREELIST GROUPS #FREE_LIST_GROUPS#
            ) )
    ;
```

In sum, rather than binding to a specific value, physical attributes are tagged with #<Tagname># definitions. The person(s) responsible for implementing the database may bind the tags to values that reflect the physical topography of the system on which the database is being run.

Optionally, a designer may implement standards of sizing across the implementation. For example, NEXT values may be the same size as INITIAL values (because they used the same tag) for all implementations of this DDL, regardless of actual size.

Once the DDL code has been generated it may be stored in a tree and forwarded to the database administrator, testing technician, or other party responsible for implementing the DDL code. In a preferred embodiment, the DDL code may be stored in a tree (i.e., a series of directories) similar to the tree described above.

In addition to DDL code, there are a number of other issues that should be managed in implementing a database. For example, the database itself must be created and tablespaces that will hold the tables/indices etc. must be defined. Further, users who shall own the objects and security policies must be defined. These issues are typically within the purview of the implementing database administrator (DBA). The designer typically has little or no say in these matters.

To facilitate a consistent implementation, files used to implement these requirements may be delivered in a tree (a series of directories), which may be referred to as an implementation 'baseline'.

In an exemplary embodiment, the party responsible for implementing the schema is responsible for binding the variables to specific system configurations. This process may be executed relatively quickly using a conventional text editor to globally replacing each tag with a value deemed appropriate, and saving the edited file to run against the database.

Figure 4:
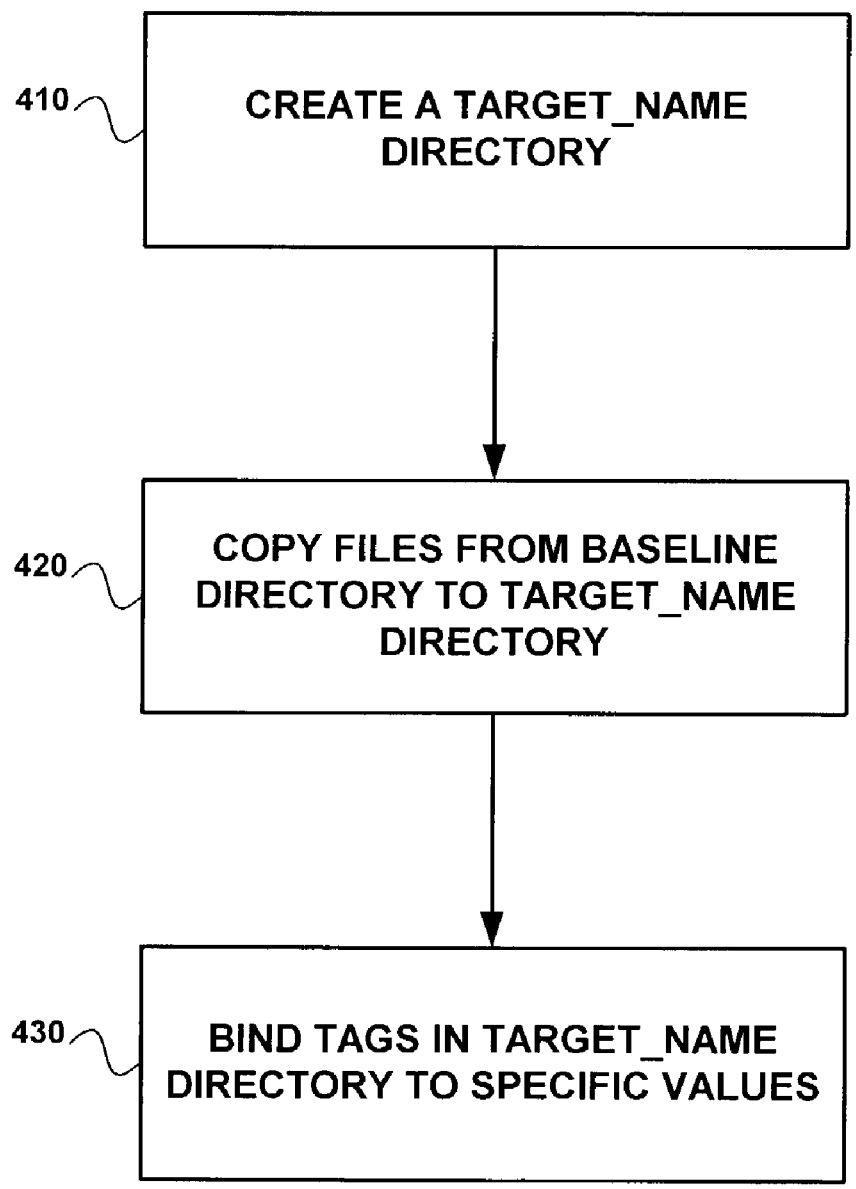
FIG. 4 is a flowchart illustrating the steps of a suitable script for generating bound DDL code.

In another embodiment, the standard Unix utility stream editor (sed) may be used to increase the efficiency of the process. The stream editor permits a user to store a series of editing commands in a file and run the editing commands against all input files to consistently produce source output files. FIG. 4 is a flowchart illustrating the steps of an exemplary process for generating bound DDL code. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

In this application, two processes are executed against the baseline tree. The first process (GenSchema) creates a target_name directory at the same level as the baseline tree (step 410). The second process traverses the baseline tree, copying each file in the baseline tree to the target directory (step 420). In one embodiment, the #<Tagname># definitions may be modified, or bound, to particular values in a script associated with the target_name directory during the copy process (step 430). In another embodiment, the baseline tree may be copied to a target_name tree with the #<Tagname># fields intact, then the #<Tagname># fields may be bound to particular values. The result is that the baseline tree remains intact and can be copied again to accommodate different system configuration, while the target_name directory is bound to a particular system configuration. The baseline tree may be copied repeatedly to generate bound trees that conform to numerous different configurations with the same 'logical footprint'.

In an exemplary embodiment, another script operates on the bound tree to execute any korne shell scripts (.ksh) or SQL files in a desired order.

The script may be embedded in a .cfg file (e.g, CreateSchema.cfg), which may be bound by the GenSchema process from the baseline directory. The CreateSchema process may first execute any .sql scripts that define roles and users. Then, the GenSchema process may execute any .ksh or .sql files in the ddl directory, the stored_procs directory, the obj_grants directory, the seed_values directory, the triggers directory, and the pub_synonyms directory.

Thus, utilizing the tools of the present invention, a database administrator or other implementer of a database design can create a database of different sized objects and potentially different placement of objects by modifying the file that contains the sed editing commands. An example of a sed script for our example would be:

```
            s/#PCT_FREE#/10/
            s/#PCT_USED#/40/
            s/#INDX_TS_00#/MY_TS/
            s/#INITIAL#/32K/
            s/#PCT_INCREASE#/0/
            s/#FREE_LISTS#/1/
            s/#FREE_LIST_GRPS#/1/
            s/#INDX_TS_00#/MY_TS/
```

This would have the effect of creating a post edited DDL of:

```
    CREATE TABLE Patent (
        patent_no       VARCHAR2(12) NOT NULL,
        Date_of_Patent  DATE NULL,
        Patent_Description VARCHAR2(2000) NULL,
        Inventor        VARCHAR2(128) NULL,
        Notice          VARCHAR2(2000) NULL,
        Application_No  VARCHAR2(20) NULL,
        Filed_dt        DATE NULL
    )
        PCTFREE 10
        PCTUSED 40
        MAXTRANS UNLIMITED
        TABLESPACE MY_TS
        STORAGE (
            INITIAL 32K
            NEXT 32K
            PCTINCREASE 0
            FREELISTS 1
            FREELIST GROUPS 1
        )
    ;
    ALTER TABLE Patent
        ADD ( PRIMARY KEY (patent_no)
        USING INDEX
        PCTFREE 10
        TABLESPACE MY_TS
        STORAGE (
            INITIAL 32K
            NEXT 32K
            PCTINCREASE 0
            FREELISTS 1
            FREELIST GROUPS 1
        ) );
```

This examples presented herein represent a small implementation, into a single tablespace, most likely for development purposes. The processes described herein also contribute significantly to scalability. For example, if a database administrator has to implement the same schema with larger sizes, then the database administrator may simply re-run the binding script with a different sed file (i.e., with larger initial values, separate tablespaces for index and data etc.). Note that the 'logical footprint' contract is identical, only sizing and placement change.

It will be noted that the in the example described herein the data and index DDL share tags for sizing. In practice, a database designer would likely create separate tags for #INITIAL_DATA# and #INITIAL_INDEX#. In practice, a database designer can choose the level of granularity.

It will be appreciated that the database administrator (or other implementer) can still choose to edit the bound source if they desire. The task should be significantly smaller than being forced to do the entire process manually.

While the invention has been particularly shown and described with reference to a preferred embodiment thereof, it will be understood by those skilled in the art that various other changes in the form and details may be made without departing from the spirit and scope of the invention.

What is claimed is:

1. A method of designing and implementing a database, comprising:
    generating database design code;
    binding the database design code to modifiable tags representative of physical parameters of a hardware platform;
    storing data definition language code in a first tree structure; and
    copying the contents of the first tree structure to a second tree structure;
    modifying the tags in the second structure to reflect particular system parameters wherein the step of modifying is performed by a script that uses a stream editor to modify the tags as they are being copied from the first tree structure to the second tree structure.

2. The method of claim 1, wherein the step of generating database design code comprises using a CASE tool.

3. The method of claim 1, wherein the step of modifying is performed after the second tree structure is created.

4. A computer program product in a computer readable medium for designing and implementing a database, comprising:
    logic instructions, executable on a processor, for generating database design code;
    logic instructions, executable on a processor, for binding the database design code to modifiable tags representative of physical parameters of a hardware platform.
    logic instructions for storing data definition language code in a first tree structure;
    logic instructions for copying the contents of the first tree structure to a second tree structure; and
    logic instructions for modifying the tags in the second structure to reflect particular system parameters wherein the logic instructions for modifying comprise a script that uses a stream editor to modify the tags as they are being copied from the first tree structure to the second tree structure.

5. The computer program product of claim 4, wherein the logic instructions for generating database design code comprises using a CASE tool.

6. The computer program product of claim 4, wherein the logic instructions for modifying is performed after the second tree structure is created.

7. A method of designing and implementing a database, comprising:
    generating database design code;
    binding the database design code to modifiable tags representative of physical parameters of a hardware platform;
    storing data definition language code in a first tree structure; and
    copying the contents of the first tree structure to a second tree structure wherein copying maintains fields associated with tags of the first tree structure intact as the contents of the first tree structure are copied to the second tree structure enabling the first tree structure to accommodate multiple system configurations;
    modifying the tags in the second structure to reflect particular system parameters wherein the step of modifying is performed by a script that uses a stream editor to modify the tags after they have been copied to the second tree structure.

8. A computer program product in a computer readable medium for designing and implementing a database, comprising:

logic instructions, executable on a processor, for generating database design code;

logic instructions, executable on a processor, for binding the database design code to modifiable tags representative of physical parameters of a hardware platform;

logic instructions, executable on a processor, for storing data definition language code in a first tree structure; and logic instructions, executable on a processor, for copying the contents of the first tree structure to a second tree structure wherein copying maintains fields associated with tags of the first tree structure intact as the contents of the first tree structure are copied to the second tree structure enabling the first tree structure to accommodate multiple system configurations;

logic instructions, executable on a processor, for modifying the tags in the second structure to reflect particular system parameters wherein the step of modifying is performed by a script that uses a stream editor to modify the tags after they have been copied to the second tree structure.

* * * * *

UNITED STATES PATENT AND TRADEMARK OFFICE
CERTIFICATE OF CORRECTION

PATENT NO. : 7,080,093 B2  Page 1 of 1
APPLICATION NO. : 10/307866
DATED : July 18, 2006
INVENTOR(S) : Richard Marejka et al.

It is certified that error appears in the above-identified patent and that said Letters Patent is hereby corrected as shown below:

Column 8, line 28, "." should be --;--

Signed and Sealed this

Thirty-first Day of October, 2006

JON W. DUDAS
*Director of the United States Patent and Trademark Office*